United States Patent [19]

Stipe

[11] Patent Number: 4,737,615
[45] Date of Patent: Apr. 12, 1988

[54] ENERGY SAVING CONTROL CIRCUIT FOR HOT WATER HEATER

[76] Inventor: Lester E. Stipe, 4020 NE. 38th Ave., Portland, Oreg. 97212

[21] Appl. No.: 824,408

[22] Filed: Jan. 31, 1986

[51] Int. Cl.$^4$ ............................................. H05B 1/02
[52] U.S. Cl. ..................... 219/330; 219/328; 219/333; 219/321; 219/486; 126/374; 236/20 R; 236/47
[58] Field of Search .............. 219/329, 321, 328, 330, 219/508, 509, 333, 483, 486, 334, 320; 236/47, 51, 20 R; 126/351, 374

[56] References Cited

U.S. PATENT DOCUMENTS

| | | | |
|---|---|---|---|
| 4,016,402 | 4/1977 | Scott | 219/334 |
| 4,058,702 | 11/1977 | Jerles | 219/321 |
| 4,267,432 | 5/1981 | Kiepe | 219/328 |
| 4,282,421 | 8/1981 | Hadar | 219/330 |
| 4,324,207 | 4/1982 | Leuthard | 122/448 |
| 4,371,779 | 2/1983 | Maynard et al. | 219/328 |
| 4,413,775 | 11/1983 | Scott | 236/20 |
| 4,467,178 | 8/1984 | Swindle | 219/330 |
| 4,568,821 | 2/1984 | Boe | 219/330 |

*Primary Examiner*—M. H. Paschall
*Attorney, Agent, or Firm*—Eugene D. Farley

[57] ABSTRACT

A hot water heater having upper and lower electric heating elements and associated thermostatic switch controls in their electric circuits is provided with an energy saving control circuit for maintaining the lower heating element deenergized at all times except when it is needed to assist the upper heating element to heat the entire contents of the hot water heater tank. The energy saving control circuit includes an energy saving switch in the electric circuit of the lower heating element. A full tank relay switch is connected in parallel with the energy saving switch and the relay coil is connected to a transformer secondary winding through a holding circuit provided by a holding relay switch the coil of which is connected to the transformer secondary through a momentary make switch. The holding relay switch serves to maintain the holding relay coil connected to the transformer secondary after the momentary make switch is opened. The transformer primary winding is connected to a source of electric potential through a photoelectric cell which is activated by light to open the circuit of the transformer primary. A neon lamp light source for the photoelectric cell is connected to the lower heater thermostatic switch in such a manner as to connect the neon lamp to the electric supply for the lower heater element when the theromstatic switch is opened upon attainment of a preselected water temperature sensed by the lower heater thermostat.

11 Claims, 1 Drawing Sheet

U.S. Patent      Apr. 12, 1988      4,737,615
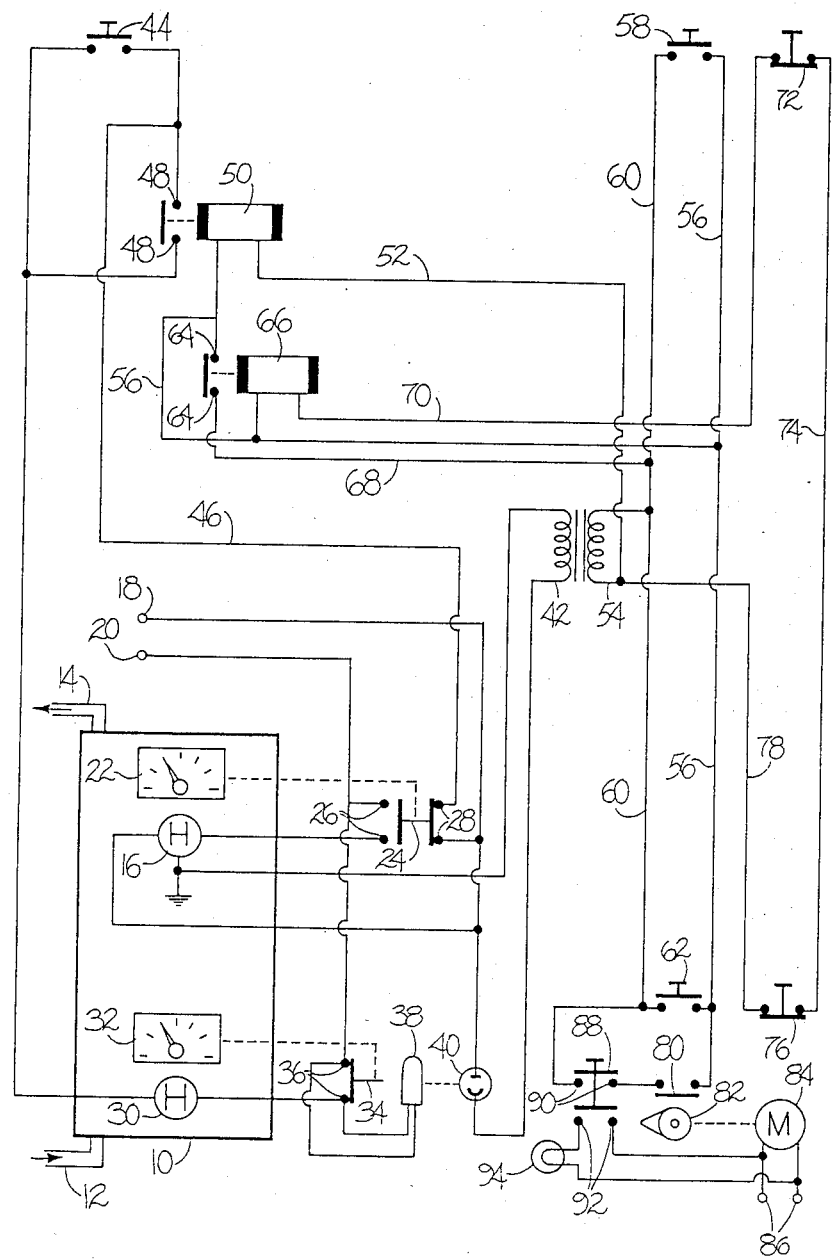

ENERGY SAVING CONTROL CIRCUIT FOR HOT WATER HEATER

BACKGROUND OF THE INVENTION

This invention relates to electric hot water heaters of the dual element type, and more particularly to an electrical control circuit by which to minimize the cost of operation of such heaters.

Hot water heaters of various types heretofore have provided means by which to minimize energy costs. For example, U.S. Pat. No. 4,371,779 provides means for sensing the flow of water to or from the hot water tank to activate the heater mechanism which may be a single electric heater or an electrically controlled combustion burner. U.S. Pat. Nos. 4,413,775; 4,166,944; and 4,016,402 disclose the control of hot water heaters by sensing the temperature of incoming cold water and/or outgoing hot water.

U.S. Pat. No. 3,329,800 discloses a type of electric hot water heater provided with dual electric heaters wherein the top and bottom heaters are controlled independently and automatically by separate thermostats, the bottom heater being used to maintain water in the lower part of the tank at a temperature somewhat lower than the water in the upper part of the tank. U.S. Pat. No. 1,712,931 discloses a type of electric hot water heater of the dual heater type wherein the smaller upper heater element is used as the primary source of heat for a small upper quantity of water, and a manual switch is provided to energize a larger lower heater element for large capacity demand, it being required that the manual switch be opened to de-energize the lower heater when the large hot water capacity is no longer needed.

Other hot water heaters provided with similar manual and automatic controls are disclosed in U.S. Pat. Nos. 1,892,557; 2,480,302; 2,834,865; 3,162,752; 3,353,001; 3,484,580; 4,058,702; 4,267,432; and 4,324,207.

SUMMARY OF THE INVENTION

In accordance with the present invention, a dual electric heater hot water tank utilizes the upper heater as the primary source of heat and the lower heater as a secondary source of heat for rapid heating of the entire contents of the tank, the lower heater being controlled either by manual switching mechanism by which to shut off the heater if election of energy saving is desired, or by which to energize the lower heater on a non-repetitive cycle if full tank heating is desired.

It is the principle objective of this invention to provide a control for a dual heater type hot water heater by which the lower heater may be turned off manually for a desired length of time, for conservation of energy, and may be turned on manually to assist the upper heater in heating the full contents of the tank, after which the lower heater is turned off automatically and may be turned on again only by a deliberate manual operation.

Another object of this invention is the provision of a dual heater type hot water heater control of the class described which also accommodates conventional thermostatically controlled operation of both upper and lower heaters.

Still another objective of this invention is the provision of a dual heater type hot water heater control of the class described in which the manual controls may be duplicated for location at remotely spaced positions for convenience of operation.

A further object of this invention is the provision of a dual heater type hot water heater control of the class described which includes a timer-operated control by which the lower heater may be activated at a preselected future time of day to provide a full tank of hot water by a preselected time.

A still further object of this invention is the provision of a dual heater type hot water heater control of the class described which is of simplified construction for economical manufacture, maintenance and repair.

The foregoing and other objects and advantages of this invention will appear from the following detailed description, taken in connection with the accompanying drawing of a preferred embodiment.

BRIEF DESCRIPTION OF THE DRAWING

The single FIGURE is a schematic electrical diagram of a dual electric hot water heater system embodying the features of this invention.

DESCRIPTION OF THE PREFERRED EMBODIMENT

For purposes of description, the drawing illustrates a hot water tank 10 provided with a cold water inlet 12 at the bottom and a hot water outlet 14 at the top. An upper electric heating element 16 is supplied with electric potential from the terminals 18 and 20 of a supply source, for example 220 volts alternating current. The heating element 16 is controlled by the upper thermostat 22 and associated electric switch 24. The electric switch is illustrated with contacts 26 in open condition and contacts 28 closed. The lower electric heating element 30 is supplied with electric potential from the same source and is controlled by the lower thermostat 32 and associated electric switch 34 shown with its contacts 36 closed.

A light source 38 in the form of a neon lamp is connected across the contacts 36 in such manner as to be shorted out when the switch 34 is closed and to be connected across the terminals 18 and 20 when the switch is open. When the light 38 illuminates the photoelectric cell 40, the photoelectric cell switch opens and thereby opens the electric circuit of transformer primary winding 42 which is connected at one end to ground and at the opposite end through the photocell to terminal 18. This circuit provides electric potential, for example 110 volts AC, to the transformer primary. The lower heater 30 is connected at one end through switch 34 to terminal 20 and at the opposite end to one contact of manually operated energy saver toggle switch 44. The other contact of switch 44 is connected through conductor 46 and contacts 28 of switch 24 to terminal 18, whereby the lower heater is energized only after the upper heater thermostat 32 has been satisfied.

Connected in parallel with switch 44 are contacts 48 of lower heater relay coil 50. This coil is connected at one end through conductor 52 to the transformer secondary winding 54 which supplies low voltage, for example 12 or 24 volts, and at the other end through conductors 56 to one contact of manually operated momentary full tank make switch 58. The other contact of switch 58 is connected through conductor 60 to the end of the secondary winding 54 opposite the direct connection of coil 50. Switch 58 is connected in parallel with a similar momentary make switch 62, whereby activation of relay coil 50 may be effected at either of two remotely spaced positions, as discussed more fully hereinafter.

The relay coil 50 also is connected through contacts 64 of holding relay coil 66 and the conductor 68 to the secondary 54. The coil 66 is connected at one end to conductor 56 and at the opposite end through conductor 70 to one contact of manually operated momentary lower heater break switch 72 located adjacent the make switch 58. The other contact of the manually operated break switch 72 is connected through conductor 74 to one contact of momentary break switch 76 located adjacent the make switch 62. The other contact of switch 76 is connected through conductors 78 to the transformer secondary winding 54.

Momentary closure of switch 58 or 62 completes the electric circuit of holding relay coil 66. Closure of the associated contacts 64 maintains the electric circuit of the relay coil 66 after opening of momentary make switch 58 or 62. In this manner, deactivation of relays 50 and 66 occurs whenever the transformer secondary 54 is de-energized, as explained more fully hereinafter.

The operation of the control system described hereinbefore is as follows: The upper heater 16 is operative at all times to maintain water in the upper portion of the tank 10 at the temperature preselected by the upper thermostat 22. When this temperature is reached, the thermostat switch 24 opens contacts 26 and closes contacts 28, as shown in the drawing.

With water in the lower portion of the tank 10 below the temperature preselected by the setting of thermostat 32, the contacts 36 of switch 34 are closed, as illustrated. The neon lamp 38 thus is shorted and the inactivated photocell 40 completes the electric circuit of the transformer primary winding 42 from terminal 18 to ground. The energized secondary 54 thus is ready to provide electric potential to the relays 50 and 66.

When it is desired to operate the hot water tank to provide a quantity of hot water which is capable of being supplied by operation of the upper heater 16 only, the energy saver switch 44 is opened, as shown, to prevent energization of the lower heating element 30. However, when a greater quantity of hot water is required that cannot be supplied by operation of the upper heating element alone, one of the full tank switches 58 or 62 is closed momentarily to energize holding relay 66. Closure of the contacts 64 of relay 66 maintains the relay energized and also completes the electric circuit of lower heater relay 50 across the secondary 54.

When the water temperature in the upper portion of tank 10 satisfies the upper thermostat 22, the associated switch 24 is transferred to the illustrated position in which contacts 28 are closed. Accordingly, the electric circuit of the lower heating element 30 is completed from terminal 18 through the closed contacts 28 of the thermostat switch 24, thence through conductor 46, closed contacts 48, lower heater 30 and the closed contacts 36 to terminal 20.

When the water temperature in the lower portion of tank 10 satisfies the lower thermostat 32, the associated switch 34 opens the contacts 36. The electric circuit of neon lamp 38 now is completed from terminal 18, through closed contacts 28 of thermostat switch 24, the closed contacts 48 of relay 50, thence through the lower heater 30 and neon lamp 38 to terminal 20. The light from neon lamp 38 energizes the photocell 40 which operates to open the electric circuit of the transformer primary 42. Consequent deactivation of the secondary 54 results in deactivation of holding relay 66 and then lower heater relay 50. Opening of the associated contacts 48 breaks the electric circuit of the lower heater and returns the control circuit to the energy saving condition established by the open switch 44.

When it once again becomes necessary to energize the lower heater 30 to provide a full tank of hot water, it is required that one of the full tank switches 58 or 62 be closed momentarily to once again energize relays 66 and 50 to complete the electric circuit of the lower heater 30, as previously described.

It is this requirement of having to manually close one of the momentary make switches 58 or 62 each time it is desired to switch from energy saving to full tank heating, that insures operation of the hot water tank at minimum cost. This is achieved since the electric circuit of the lower heater 30 is opened when the lower thermostat 32 is satisfied, and said electric circuit cannot be completed again except by the conscious manual closing of one of the full tank momentary make switches 58 or 62.

The break switches 72 or 76 are provided to afford earlier deactivation of the lower heater 30, when desired, i.e. before it is deactivated by operation of the thermostat 32.

It will be apparent that when it is desired to operate both heater elements 16 and 30 continuously to provide the full tank with hot water, the energy saver switch 44 is closed to afford operation of both heaters under the control only of their associated thermostats 22 and 32.

The provision of two full tank momentary make switches 58 and 62 and two break switches 72 and 76 affords operation of the heater control circuit from remotely spaced positions. For example, the switches 44, 58 and 72 may be located adjacent the hot water tank 10, such as in a basement of a residence, and the switches 62 and 76 may be located in the kitchen of the residence for convenience of use at that position remote from the hot water tank.

Means may be provided to afford delayed activation of the lower heater 30 so that a full tank of hot water may be available at a preselected future time of the day. In the embodiment illustrated, this is provided by a timer which includes an electric switch 80 operated by a cam 82 driven by an electric motor 84 connected to terminals 86 of a source of electric potential. A master switch 88 is provided with contacts 90 arranged in series with the switch 80, and the series is connected across the momentary make switch 62. The master switch 88 may include a second pole and associated contacts 92 for connecting an indicator light 94 to the terminals 86.

In operation, the timer may be set for a desired future time of day for the lower heater 30 to have assisted the upper heater 16 in providing a full tank of hot water. The timer will have energized the lower heater about three hours prior to the timer setting. The master switch 80 is closed, the second pole contacts 92 also closing to activate the indicator light 94 to provide indication that the timer system is in operation. When the desired time is reached on the timer, the cam 82 closes the switch 80 momentarily to energize relays 66 and 50 and complete the electric circuit of the lower heater 30, as previously described. When the timer system is no longer needed, it is deactivated by opening the switch 88.

From the foregoing it will be appreciated that the present invention provides a control by which a hot water tank may be operated with maximum savings of energy and correspondingly minimum cost by preventing operation of one of two heater units except by the conscious manual operation of a switch each time it is desired to energize the heater. This prevents excessive operation of both heater elements when one element is all that is required, by relieving the reliance on memory to disconnect the second heater when not needed.

It will be apparent to those skilled in the art that the various changes may be made in details of the electric control circuit described hereinbefore. For example, if holding relay 66 is available with two poles, one of which will accommodate the high voltage at terminals 18 and 20 and the other of which will accommodate the low voltage of the secondary winding 54, the lower heater contacts 48 may be associated with the second pole for operation by relay 66, in which case relay 50 accordingly would be omitted. A second energy saver switch 44 may be arranged in parallel with the switch 44 illustrated, and positioned at the remote location of switches 62 and 76. These and other modifications may be made, as desired, without departing from the spirit of this invention and the scope of the appended claims.

I claim:

1. In combination with a hot water heater having upper and lower electric heating elements having electric circuits and associated upper and lower thermostat switches for opening and closing the electric circuits of said heating elements, an energy saving control circuit comprising:
   (a) an energy saver switch in the electric circuit of the lower heating element operable to open and close said circuit,
   (b) a normally open full tank relay switch in parallel with said energy saver switch, for opening and closing the circuit of the lower heating element,
   (c) an electric circuit for the coil of said full tank relay switch,
   (d) holding circuit means for connecting the electric circuit of said coil to a source of electric potential, to energize said coil and close said normally open full tank relay switch and activate said lower heating element,
   (e) a momentary manual make switch in said holding circuit means for initiating closing of said holding circuit means, and
   (f) means in said holding circuit means for deactivating said holding circuit means upon opening of the lower thermostat switch, for preventing subsequent activation of the lower heating element except by manual operation of the momentary make switch.

2. The combination of claim 1 wherein the holding circuit means comprises:
   (a) a holding relay switch in the electric circuit for the full tank relay coil, and
   (b) an electric circuit for the coil of the holding relay switch,
   (c) said momentary make switch being included in said electric circuit for the coil of the holding relay switch.

3. The combination of claim 1 wherein the means for deactivating said holding circuit means comprises:
   (a) a transformer having a primary winding and a secondary winding,
   (b) the holding circuit means being connected to said secondary winding, and
   (c) switch means in the electric circuit of the primary winding operable upon opening of the lower thermostat switch to open said electric circuit of the primary winding.

4. The combination of claim 3 wherein the switch means in the electric circuit of the primary winding comprises:
   (a) a photoelectric cell having an electric switch,
   (b) a light source associated with the photoelectric cell for opening the switch thereof, and
   (c) an electric circuit for the light source connected to the lower thermostat switch.

5. The combination of claim 1 including a second momentary make switch connected in parallel with the first named momentary make switch for location at a remote distance from the latter.

6. The combination of claim 1 including a momentary make timer switch connected in parallel with the first named momentary make switch for initiating closing of the holding circuit means at a preselected future time.

7. The combination of claim 1 including a momentary break switch in said holding circuit means.

8. In combination with a hot water heater having upper and lower electric heating elements having electric circuits and associated upper and lower thermostat switches for opening and closing the electric circuits of said heating elements, an energy saving control circuit comprising:
   (a) an energy saver switch in the electric circuit of the lower heating element operable to open and close said circuit,
   (b) a normally open full tank relay switch in parallel with said energy saver switch, for opening and closing the circuit of the lower heating element,
   (c) an electric circuit for the coil of said full tank relay switch,
   (d) a holding relay switch in the electric circuit for the full tank relay coil,
   (e) an electric holding circuit for the coil of the holding relay switch to energize said coil and close said normally open full tank relay switch and activate said lower heating element,
   (f) a momentary manual make switch in said holding circuit for initiating closing of said holding circuit,
   (g) a transformer having a primary winding and a secondary winding,
   (h) the holding circuit being connected to said secondary winding,
   (i) a photoelectric cell having an electric switch in the circuit of the transformer primary winding,
   (j) a light source associated with the photoelectric cell for opening the switch thereof, and
   (k) an electric circuit for the light source connected to thelower thermostat switch, for preventing subsequent activation of the lower heating element except by manual operation of the mamentary make switch.

9. The combination of claim 8 including a second momentary make switch connected in parallel with the first named momentary make switch for location at a remote distance from the latter.

10. The combination of claim 8 including a momentary make timer switch connected in parallel with the first named momentary make switch for initiating closing of the holding circuit.

11. The combination of claim 10 including a momentary break switch in said holding circuit.

* * * * *